United States Patent
Pettersson

(10) Patent No.: US 10,518,626 B2
(45) Date of Patent: Dec. 31, 2019

(54) HYBRID VEHICLE

(71) Applicant: FORD GLOBAL TECHNOLOGIES, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/975,397

(22) Filed: May 9, 2018

(65) Prior Publication Data
US 2019/0344655 A1 Nov. 14, 2019

(51) Int. Cl.
| | |
|---|---|
| B60K 6/00 | (2006.01) |
| B60K 6/383 | (2007.10) |
| B60W 10/02 | (2006.01) |
| B60K 6/40 | (2007.10) |
| B60K 6/547 | (2007.10) |
| B60W 20/40 | (2016.01) |
| B60K 6/48 | (2007.10) |

(52) U.S. Cl.
CPC .......... B60K 6/383 (2013.01); B60K 6/40 (2013.01); B60K 6/547 (2013.01); B60W 10/02 (2013.01); B60W 20/40 (2013.01); *B60K 2006/4825* (2013.01)

(58) Field of Classification Search
CPC .......... B60K 6/383; B60K 6/40; B60K 6/547; B60K 6/48; B60W 10/02; B60W 20/40; B60W 10/196; B60W 10/06
See application file for complete search history.

(56) References Cited

U.S. PATENT DOCUMENTS

| | | | |
|---|---|---|---|
| 8,298,105 B2 | 10/2012 | Kajigai et al. | |
| 8,892,290 B2* | 11/2014 | Reed | B60W 10/196 701/22 |
| 9,039,570 B2* | 5/2015 | Doering | B60K 6/48 477/86 |
| 9,156,469 B2* | 10/2015 | Gibson | B60W 20/40 |
| 9,322,380 B2* | 4/2016 | Doering | F02D 41/023 |
| 9,393,954 B2* | 7/2016 | Gibson | F02D 41/022 |
| 2015/0266469 A1* | 9/2015 | Gibson | F02N 11/006 701/22 |
| 2016/0025207 A1* | 1/2016 | Miyamoto | F16H 57/0439 701/68 |
| 2017/0166194 A1* | 6/2017 | Kumazaki | B60W 10/06 |
| 2017/0291599 A1* | 10/2017 | Pietron | B60W 20/40 |

* cited by examiner

*Primary Examiner* — Hau V Phan
(74) *Attorney, Agent, or Firm* — David Kelley; Brooks Kushman P.C.

(57) ABSTRACT

A vehicle includes an engine, an electric machine, a torque converter, and a first one-way clutch. The torque converter has an impeller rotatably coupled to the engine. The torque converter also has a turbine. The first one-way clutch is configured to, responsive to turbine and electric machine speeds being equal, couple the turbine and electric machine in a first rotational direction to transfer power from the turbine to the electric machine. The first one-way clutch is also configured to, responsive to electric machine speed being greater than turbine speed, isolate the turbine from the electric machine.

14 Claims, 4 Drawing Sheets

HYBRID VEHICLE

TECHNICAL FIELD

The present disclosure relates to hybrid vehicles and hybrid vehicle powertrain configurations.

BACKGROUND

Hybrid vehicles may utilize multiple power sources to generate power within a powertrain of the hybrid vehicle.

SUMMARY

A vehicle includes an engine, an electric machine, a torque converter, and a first one-way clutch. The torque converter has an impeller rotatably coupled to the engine. The torque converter also has a turbine. The first one-way clutch is configured to, responsive to turbine and electric machine speeds being equal, couple the turbine and electric machine in a first rotational direction to transfer power from the turbine to the electric machine. The first one-way clutch is also configured to, responsive to electric machine speed being greater than turbine speed, isolate the turbine from the electric machine.

A vehicle includes an engine, an electric machine, a torque converter, and a first one-way clutch. The engine has a crankshaft. The electric machine has a rotor. The torque converter has an impeller rotatably coupled to the crankshaft. The torque converter also has a turbine. The first one-way clutch is configured to, responsive to turbine and rotor speeds being equal, couple the turbine and rotor in a first direction to transfer engine power from the turbine to the rotor. The first one-way clutch is also configured to, responsive to rotor speed being greater than turbine speed, decouple the turbine and rotor.

A vehicle includes an engine, an electric machine, a launch clutch and a first one-way clutch. The launch clutch has an input rotatably coupled to the engine. The launch clutch also has an output. The first one-way clutch is configured to, responsive to output and electric machine speeds being equal, couple the output and electric machine in a first rotational direction to transfer power from the output to the electric machine. The first one-way clutch is also configured to, responsive to electric machine speed being greater than output speed, isolate the output from the electric machine.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
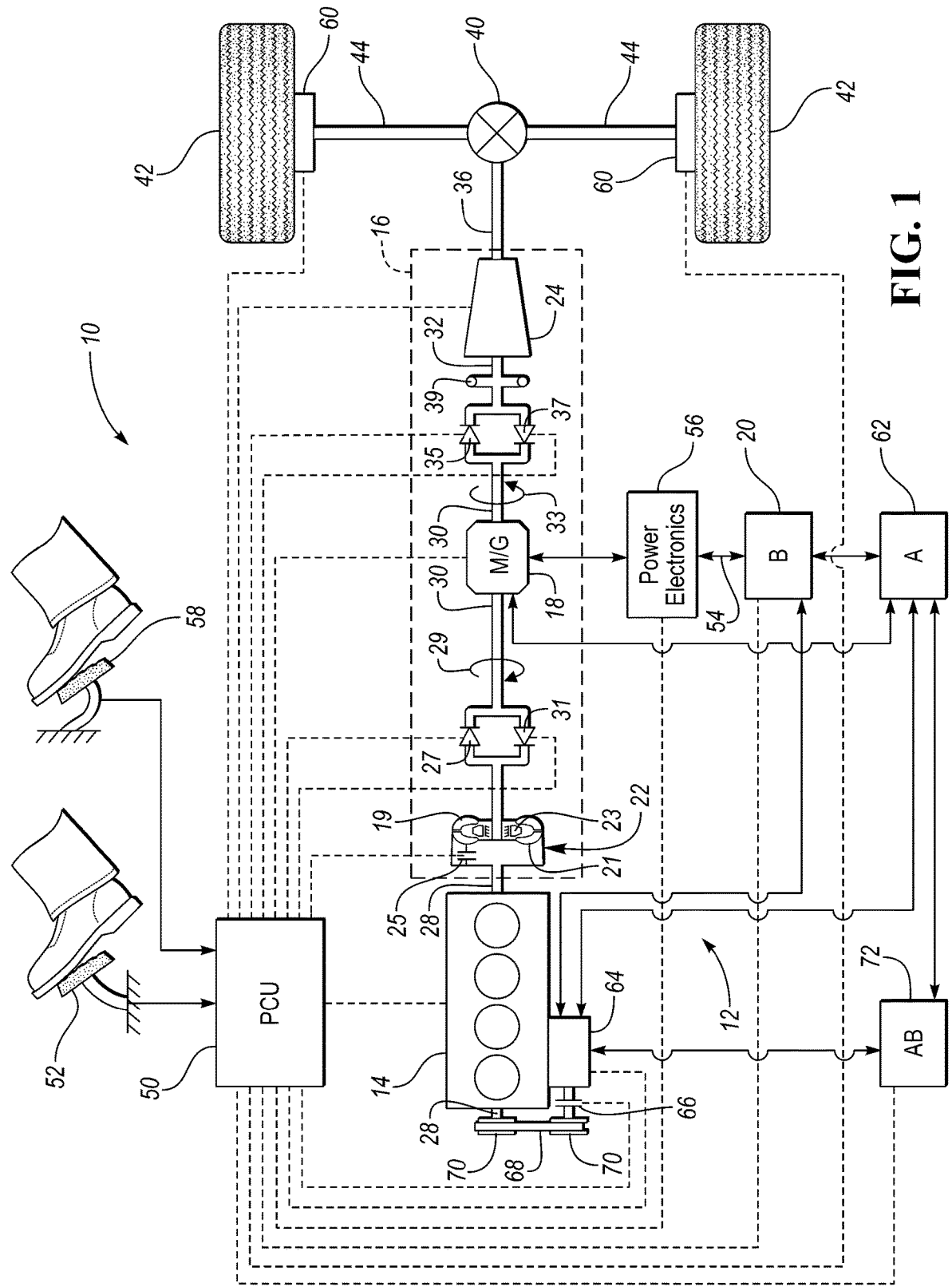
FIG. 1 is a schematic illustration of a first embodiment of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 through the torque converter 22. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

The torque converter 22 includes an input (i.e., the impeller 19), an output (i.e., turbine 21), and a stator 23. The torque converter may also include a torque converter lock-up clutch 25 (also known as a torque converter bypass clutch) that is configured to lock the impeller 19 to the turbine 21. When engaged, the lock-up clutch 25 frictionally or mechanically couples the impeller 19 to the turbine 21 of the torque converter 22, permitting more efficient power transfer. In a slipping condition of the lock-up clutch 25 the impeller 19 and turbine 21 may be configured to rotate at different speeds. In a locked condition of the lock-up clutch 25 the impeller 19 and turbine 21 are configured to rotate at the same speed. The impeller 19 of the torque converter 22 may be rotatably coupled to the engine 14. More specifically, the impeller 19 of the torque converter 22 may be rotatably coupled to a crankshaft 28 of the engine 14.

A first one-way clutch 27 may be disposed between the torque converter 22 and the M/G 18. More specifically, the turbine 21 of the torque converter 22 and a rotor of the M/G 18 may each be rotatably coupled to the first one-way clutch 27. The first one-way clutch 27 may be a selectable one-way clutch. In an "activated condition," the first one-way clutch 27 may be configured to engage and couple the turbine 21 and M/G 18 (or more specifically the rotor of the M/G 18) in a first rotational direction 29 to transfer power generated by the engine 14 from the turbine 21 to the M/G 18 (or more specifically the rotor of the M/G 18) in response to the rotational speeds of the turbine 21 and the M/G 18 (or more specifically the rotor of the M/G 18) being equal in the first rotational direction 29. Also in the "activated condition," the first one-way clutch 27 may be configured to disengage and isolate the turbine 21 from the M/G 18 (or more specifically the rotor of the M/G 18) such that no power is transferred from the turbine 21 to the M/G 18 (or more specifically the rotor of the M/G 18) in response to the rotational speed of the M/G 18 (or more specifically the rotor of the M/G 18) being greater than the rotational speed of the turbine 21 in the first rotational direction 29. This "activated" but "disengaged" state may be referred to as an overrunning condition of the first one-way clutch 27. In a "deactivated condition," the first one-way clutch 27 may be configured to disengage and isolate the turbine 21 from the M/G 18 (or more specifically the rotor of the M/G 18) at all rotational speeds of the turbine 21 and the M/G 18 (or more specifically the rotor of the M/G 18).

A second one-way clutch 31 may be disposed between the torque converter 22 and the M/G 18. More specifically, the turbine 21 of the torque converter 22 and the rotor of the M/G 18 may each be rotatably coupled to the second one-way clutch 31. The second one-way clutch 31 may be a selectable one-way clutch. In an "activated condition," the second one-way clutch 31 may be configured to engage and couple the turbine 21 and M/G 18 (or more specifically the rotor of the M/G 18) in a second rotational direction 33, that is opposite to the first rotational direction 29, to transfer power from the M/G 18 (or more specifically the rotor of the M/G 18) to the turbine 21 in response to the rotational speeds of the turbine 21 and the M/G 18 (or more specifically the rotor of the M/G 18) being equal in the second rotational direction 33. Also in the "activated condition," the second one-way clutch 31 may be configured to disengage and isolate the turbine 21 from the M/G 18 (or more specifically the rotor of the M/G 18) such that no power is transferred from the M/G 18 (or more specifically the rotor of the M/G 18) to the turbine 21 in response to the rotational speed of the turbine 21 being greater than the rotational speed of the M/G 18 (or more specifically the rotor of the M/G 18) in the second rotational direction 33. This "activated" but "disengaged" state may be referred to as an overrunning condition of the second one-way clutch 31. In a "deactivated condition," the second one-way clutch 31 may be configured to disengage and isolate the turbine 21 from the M/G 18 (or more specifically the rotor of the M/G 18) at all rotational speeds of the turbine 21 and the M/G 18 (or more specifically the rotor of the M/G 18). The first one-way clutch 27 and the second one-way clutch 31 may collectively be referred to as a selectable two-way clutch.

Power flow from the engine 14 to the M/G 18 or from the M/G 18 to the engine 14 is possible through the first one-way clutch 27 or the second one-way clutch 31, respectively, in conjunction with the torque converter 22 or the lock-up clutch 25 (when in a slipping or locked condition). The torque converter 22 thus provides a hydraulic coupling between the crankshaft 28 and a M/G shaft 30 via either the first one-way clutch 27 or the second one-way clutch 31. For example, the first one-way clutch 27 may be engaged and the M/G 18 may operate as a generator to convert rotational energy provided by the crankshaft 28 and M/G shaft 30 into electrical energy to be stored in the battery 20. The first one-way clutch 27 and the second one-way clutch 31 may both be disengaged to isolate the engine 14 and the torque converter 22 from the remainder of the powertrain 12 such that the M/G 18 can act as the sole drive source for the HEV 10. The rotor of the M/G 18 may be affixed to the M/G shaft 30 which extends through the M/G 18. The M/G 18 is continuously drivably connected to the shaft 30, whereas the engine 14 and torque converter 22 are drivably connected and rotatably coupled to the shaft 30 only when either the first one-way clutch 27 or the second one-way clutch 31 are engaged.

The torque converter 22 transmits power from the impeller 19 to the turbine 21 when the impeller 19 rotates faster than the turbine. The magnitude of the turbine torque and impeller torque generally depend upon the relative speeds. When the ratio of impeller speed to turbine speed is sufficiently high, the turbine torque is a multiple of the impeller torque. The torque converter lock-up clutch 25 may be operated as a launch clutch to provide smooth vehicle launch. Alternatively, a launch clutch may be provided between the engine 14 and the one-way clutches (i.e., the first one-way clutch 27 and the second one-way clutch 31) for applications that do not include a torque converter 22.

A third one-way clutch 35 may be disposed between the M/G 18 and the transmission gearbox 24. More specifically, the rotor of the M/G 18 (which is secured to the M/G shaft 30) and a transmission input shaft 32 may each be rotatably coupled to the third one-way clutch 35. The third one-way clutch 35 may be a selectable one-way clutch. In an "activated condition," the third one-way clutch 35 may be configured to engage and couple the M/G 18 (or more specifically the rotor of the M/G 18) and the transmission input shaft 32 in the first rotational direction 29 to transfer power from the M/G 18 (or more specifically the rotor of the M/G 18) to the transmission gearbox 24 in response to the rotational speeds of the M/G 18 (or more specifically the rotor of the M/G 18) and the transmission input shaft 32 being equal in the first rotational direction 29. Also in the "activated condition," the third one-way clutch 35 may be configured to disengage and isolate the M/G 18 (or more specifically the rotor of the M/G 18) from the transmission gearbox 24 such that no power is transferred from the M/G 18 (or more specifically the rotor of the M/G 18) to the transmission gearbox 24 in response to the rotational speed of the transmission input shaft 32 being greater than the rotational speed of the M/G 18 (or more specifically the rotor of the M/G 18) in the first rotational direction 29. This "activated" but "disengaged" state may be referred to as an overrunning condition of the third one-way clutch 35. In a "deactivated condition," the third one-way clutch 35 may be configured to disengage and isolate the M/G 18 (or more specifically the rotor of the M/G 18) from the transmission gearbox 24 at all rotational speeds of the M/G 18 (or more specifically the rotor of the M/G 18) and the transmission input shaft 32.

A fourth one-way clutch 37 may be disposed between the M/G 18 and the transmission gearbox 24. More specifically, the rotor of the M/G 18 (which is secured to the M/G shaft 30) and a transmission input shaft 32 may each be rotatably coupled to the fourth one-way clutch 37. The fourth one-way clutch 37 may be a selectable one-way clutch. In an "activated condition," the fourth one-way clutch 37 may be configured to engage and couple the M/G 18 (or more specifically the rotor of the M/G 18) and the transmission input shaft 32 in the second rotational direction 33 to transfer power from the transmission gearbox 24 to the M/G 18 (or more specifically the rotor of the M/G 18) in response to the rotational speeds of the M/G 18 (or more specifically the rotor of the M/G 18) and the transmission input shaft 32 being equal in the second rotational direction 33. Also in the "activated condition," the fourth one-way clutch 37 may be configured to disengage and isolate the M/G 18 (or more specifically the rotor of the M/G 18) from the transmission gearbox 24 such that no power is transferred from the transmission gearbox 24 to the M/G 18 (or more specifically the rotor of the M/G 18) in response to the rotational speed of the M/G 18 (or more specifically the rotor of the M/G 18) being greater than the rotational speed of the transmission input shaft 32 in the second rotational direction 33. This "activated" but "disengaged" state may be referred to as an overrunning condition of the fourth one-way clutch 37. In a "deactivated condition," the fourth one-way clutch 37 may be configured to disengage and isolate the M/G 18 (or more specifically the rotor of the M/G 18) from the transmission gearbox 24 at all rotational speeds of the M/G 18 (or more specifically the rotor of the M/G 18) and the transmission input shaft 32. The third one-way clutch 35 and the fourth one-way clutch 37 may collectively be referred to as a selectable two-way clutch. A torsional damper 39 may be disposed between the transmission gearbox 24 and the one-way clutches (i.e., the third one-way clutch 35 and the fourth one-way clutch 37).

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, first one-way clutch 27, second one-way clutch 31, third one-way clutch 35, fourth one-way clutch 37, M/G 18, battery 20, transmission lock-up clutch 25, transmission gearbox 24, a launch clutch if used in place of the torque converter 22 (see embodiment described in FIG. 2), and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for a launch clutch if used in place of the torque converter 22, the torque converter lock-up clutch 25, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter lock-up clutch 25 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of a launch clutch if used in place of the torque converter 22 and the torque converter lock-up clutch 25. A launch clutch (if used in place of the torque converter 22) or the torque converter lock-up clutch 25 can be modulated across a range between the engaged and disengaged positions. In the torque converter lock-up clutch 25, this produces a variable slip in the torque converter 22 in addition to the variable slip produced by the hydrodynamic coupling between the impeller 19 and the turbine 21. Alternatively, the torque converter lock-up clutch 25 may be operated as locked or open without using a modulated operating mode depending on the particular application.

To drive the vehicle with the engine 14, the first one-way clutch 27 and third one-way clutch 35 are engaged, while the second one-way clutch 31 and fourth one-way clutch 37 may be disengaged, to transfer engine torque and power through the M/G 18, and then from the M/G 18 to the gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the first one-way clutch 27 is disengaged to isolate the engine 14 from the remainder of the powertrain 12 (it should be noted that the third one-way clutch 35 remains engaged while the second one-way clutch 31 and fourth one-way clutch 37 may remain disengaged when the M/G 18 is driving the vehicle as the sole power source). Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

The M/G 18 may act as a motor and provide a driving force for the powertrain 12, as long as the third one-way clutch 35 is engaged. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10 when the first one-way clutch 27 is engaged, for example. The M/G 18 may additionally act as a generator during times of regenerative braking, when the fourth one-way clutch 37 is engaged, in which torque and rotational (or motive) energy or power from spinning wheels 42 is transferred back through the gearbox 24 and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, entertainment systems or any other system or device that is electrically operated.

A starter 64 may be coupled to the engine 14 (i.e., may be coupled to the crankshaft 28 of the engine 14). The starter 64 may be an electric motor that is configured to provide torque to the crankshaft 28 to start the engine 14. Alternatively, the starter 64 may be an integrated starter/generator (ISG) that operates as an electric motor to provide torque to the crankshaft 28 to start the engine 14 and as a generator or alternator (by receiving torque from the engine 14) to provide electrical power to recharge a battery (e.g., an accessory battery 72 or traction battery 20) or power various subcomponents of the vehicle (e.g., vehicle accessories 62). The starter 64 may also provide additional torque to the powertrain 12 during vehicle operations. The starter 64 may be selectively coupled to the engine by a clutch 66, belt 68, and a pair of pulleys 70. If the starter 64 is coupled to the engine by a belt 68 it may be referred to as a belt integrated starter-generator (BISG). The controller 50 may be configured to transmit signals to the starter 64 to operate the starter 64 as either a motor or a generator. The controller may also be configured to transmit signals to the clutch 66 in order to open or close the clutch 66. The starter 64 will be coupled to the engine 14 when the clutch is in a closed state and decoupled from the engine 14 when the clutch 66 is in an open state. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Figure 2:
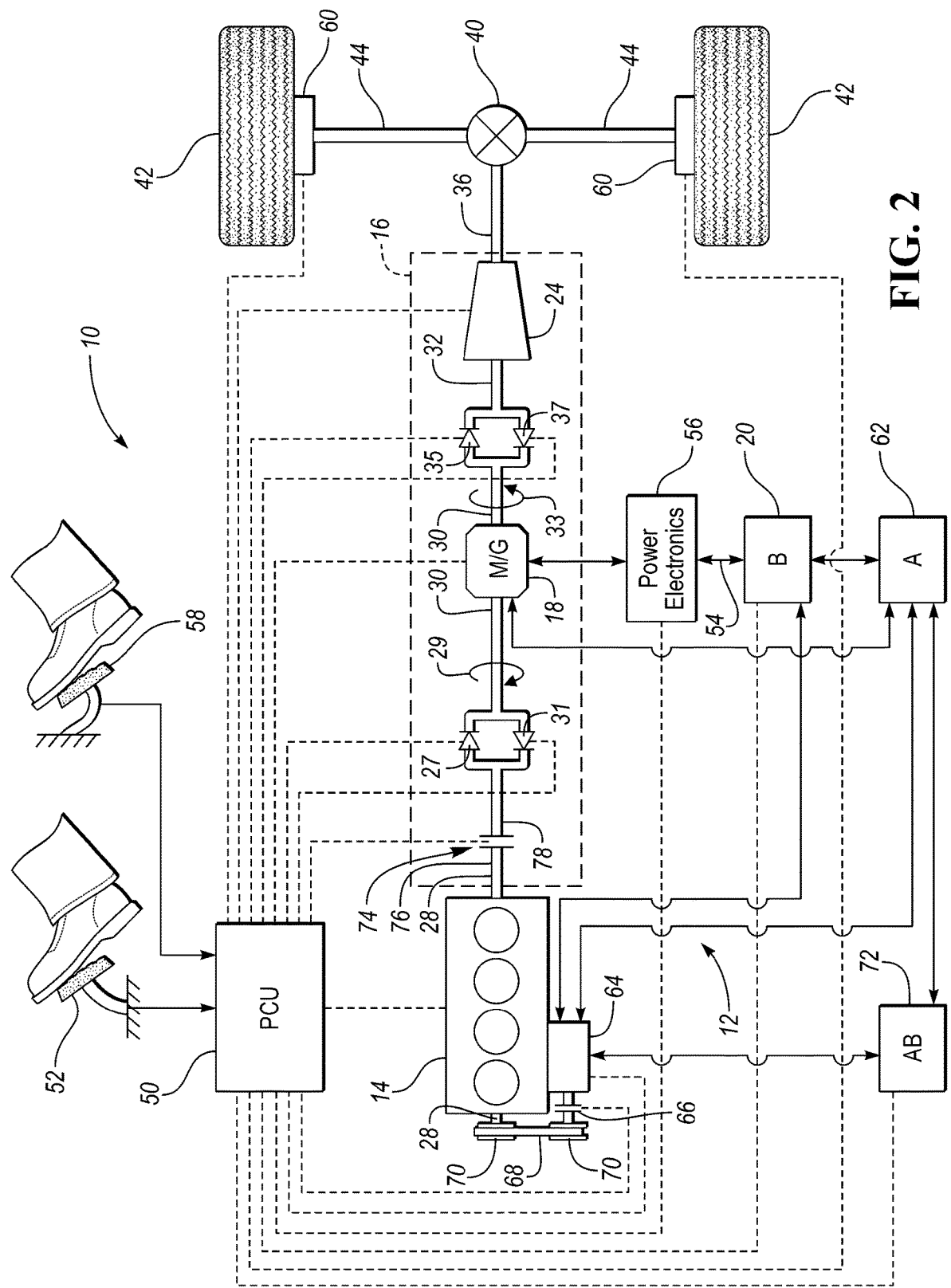
FIG. 2 is a schematic illustration of a second embodiment of an exemplary powertrain of a hybrid electric vehicle.

Referring to FIG. 2, a schematic diagram of an alternative embodiment of the hybrid electric vehicle (HEV) 10 is illustrated. The elements of the alternative embodiment depicted in FIG. 2 that are common to elements in FIG. 1 will have the same structure and functionally as described with respect to FIG. 1 unless otherwise stated herein. The alternative embodiment replaces the torque converter 22 with a launch clutch 74. The launch clutch 74 is disposed between the engine 14 and the one-way clutches (i.e. the first one-way clutch 27 and second one-way clutch 31). More specifically, an input 76 to the launch clutch 74 is rotatably coupled to the engine 14 (or specifically the input 76 to the launch clutch 74 is rotatably secured to the crankshaft 28 or is an integral portion of the crankshaft 28). An output 78 of the launch clutch 74 is rotatably coupled to the first one-way clutch 27 and the second one-way clutch 31. The input 76 and the output 78 may each be shafts. The launch clutch 74 may be configured to decouple the engine 14 from the remainder of the powertrain 12 when in an opened position and to couple the engine 14 to the remainder of the powertrain when in a closed position. The launch clutch 74 may be in a locked condition or a slipping condition when in the closed position.

In the alternative embodiment, the first one-way clutch 27 may be disposed between the launch clutch 74 and the M/G 18. More specifically, the output 78 of the launch clutch 74 and the rotor of the M/G 18 may each be rotatably coupled to the first one-way clutch 27. In the "activated condition," the first one-way clutch 27 may be configured to engage and couple the output 78 of the launch clutch 74 and M/G 18 (or more specifically the rotor of the M/G 18) in the first rotational direction 29 to transfer power generated by the engine 14 from the output 78 of the launch clutch 74 to the M/G 18 (or more specifically the rotor of the M/G 18) in response to the rotational speeds of the output 78 of the launch clutch 74 and the M/G 18 (or more specifically the rotor of the M/G 18) being equal in the first rotational direction 29. Also in the "activated condition," the first one-way clutch 27 may be configured to disengage and isolate the output 78 of the launch clutch 74 from the M/G 18 (or more specifically the rotor of the M/G 18) such that no power is transferred from the output 78 of the launch clutch 74 to the M/G 18 (or more specifically the rotor of the M/G 18) in response to the rotational speed of the M/G 18 (or more specifically the rotor of the M/G 18) being greater than the rotational speed of the output 78 of the launch clutch 74 in the first rotational direction 29. This "activated" but "disengaged" state may be referred to as an overrunning condition of the first one-way clutch 27. In a "deactivated condition," the first one-way clutch 27 may be configured to disengage and isolate the output 78 of the launch clutch 74 from the M/G 18 (or more specifically the rotor of the M/G 18) at all rotational speeds of the output 78 of the launch clutch 74 and the M/G 18 (or more specifically the rotor of the M/G 18).

The second one-way clutch 31 may be disposed between the output 78 of the launch clutch 74 and the M/G 18. More specifically, the output 78 of the launch clutch 74 and the rotor of the M/G 18 may each be rotatably coupled to the second one-way clutch 31. In an "activated condition," the second one-way clutch 31 may be configured to engage and couple the output 78 of the launch clutch 74 and M/G 18 (or more specifically the rotor of the M/G 18) in the second rotational direction 33 to transfer power from the M/G 18 (or more specifically the rotor of the M/G 18) to the output 78 of the launch clutch 74 in response to the rotational speeds of the output 78 of the launch clutch 74 and the M/G 18 (or more specifically the rotor of the M/G 18) being equal in the second rotational direction 33. Also in the "activated condition," the second one-way clutch 31 may be configured to disengage and isolate the output 78 of the launch clutch 74 from the M/G 18 (or more specifically the rotor of the M/G 18) such that no power is transferred from the M/G 18 (or more specifically the rotor of the M/G 18) to the output 78 of the launch clutch 74 in response to the rotational speed of the output 78 of the launch clutch 74 being greater than the rotational speed of the M/G 18 (or more specifically the rotor of the M/G 18) in the second rotational direction 33. This "activated" but "disengaged" state may be referred to as an overrunning condition of the second one-way clutch 31. In a "deactivated condition," the second one-way clutch 31 may be configured to disengage and isolate the output 78 of the launch clutch 74 from the M/G 18 (or more specifically the rotor of the M/G 18) at all rotational speeds of the output 78 of the launch clutch 74 and the M/G 18 (or more specifically the rotor of the M/G 18).

Figure 3:
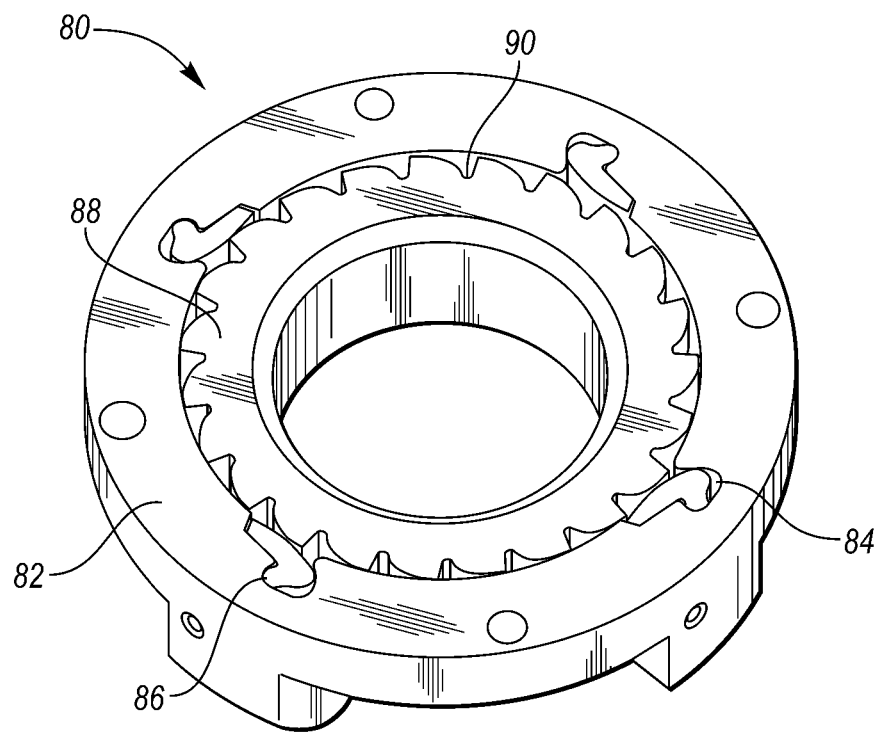
FIG. 3 is a schematic view of an exemplary electromagnetic one-way clutch.
Figure 4:
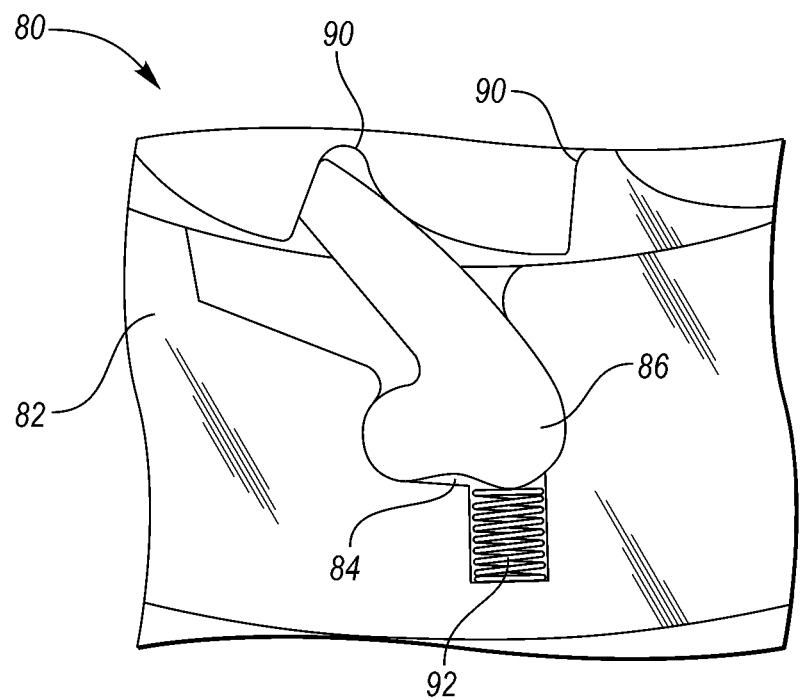
FIG. 4 is a detail view of the exemplary electromagnetic one-way clutch.

Referring now to FIGS. 3 and 4, a rocker one-way clutch 80 (which may be an electromagnetic clutch) as may be used in conjunction with the present disclosure is illustrated schematically. The rocker one-way clutch 80 may be representative of any of the one-way clutches described herein (i.e., first one-way clutch 27, second one-way clutch 31, third one-way clutch 35, and fourth one-way clutch 37). However, it should be understood that the rocker one-way clutch 80 is just an example of one type of selectable one-way clutch and that the one-way clutches described herein (i.e., first one-way clutch 27, second one-way clutch 31, third one-way clutch 35, and fourth one-way clutch 37) may be any type of one-way clutch. The rocker one-way clutch 80 includes a rocker plate 82 having pockets 84, each pocket 84 containing a corresponding rocker 86 which is pivotally hinged within the respective pockets 84. The clutch 80 also includes a cam plate 88, which has a plurality of notches 90 that define teeth. When the rockers 86 are pivoted relative to the pockets 84, the teeth may catch inwardly extending portions of the rockers 86. The rockers 86 are biased by a spring 92 to remain within the pockets without protruding. In this configuration, there is no engagement between the rockers 86 and the notches 90, and thus no power or torque is transferred between the rocker plate 82 and cam plate 88. FIG. 3 illustrates the clutch 80 in this deactivated and disengaged position (where the rockers 86 are retracted and there is no engagement between the rockers 86 and the notches 90).

The cam plate 88 contains a coil [not illustrated] that may be selectively electrified to produce a magnetic force and engage the clutch 80. In response to the magnetic force, the rockers 86 pivot outward (i.e., deploy) from the pockets 84, against the bias force of the spring 92, such that a portion of the rockers 86 protrudes beyond a radially inward face of the rocker plate 82. The protruding portion of the rockers 86 may engage with the notches 90 and transfer torque between the rocker plate 82 and cam plate 88 in one direction of rotation. FIG. 4 illustrates the clutch 80 in this activated and engaged position (where the rockers 86 are deployed and there is engagement between the rockers 86 and the cam plate 88 within the notches 90).

Although the rocker plate 82 is illustrated as the outer race of the clutch 80 and the cam plate 88 is illustrated as the inner race of the clutch 80, it should be understood that the clutch 80 may include other configurations, such as a configuration where the cam plate 88 is the outer race and the rocker plate 82 is the inner race. The clutch may also be in an activated and disengaged position (where the rockers 86 are deployed but there is no engagement between the rockers 86 and the cam plate 88 within the notches 90 due to the speed of the cam plate 88 being greater than the rotational speed of the rocker plate 82). In the activated and disengaged position, the rockers 86 will slide along the ramped surfaces of the teeth, opposite to the direction of engagement shown in FIG. 4, causing a ratcheting effect.

Figure 5:
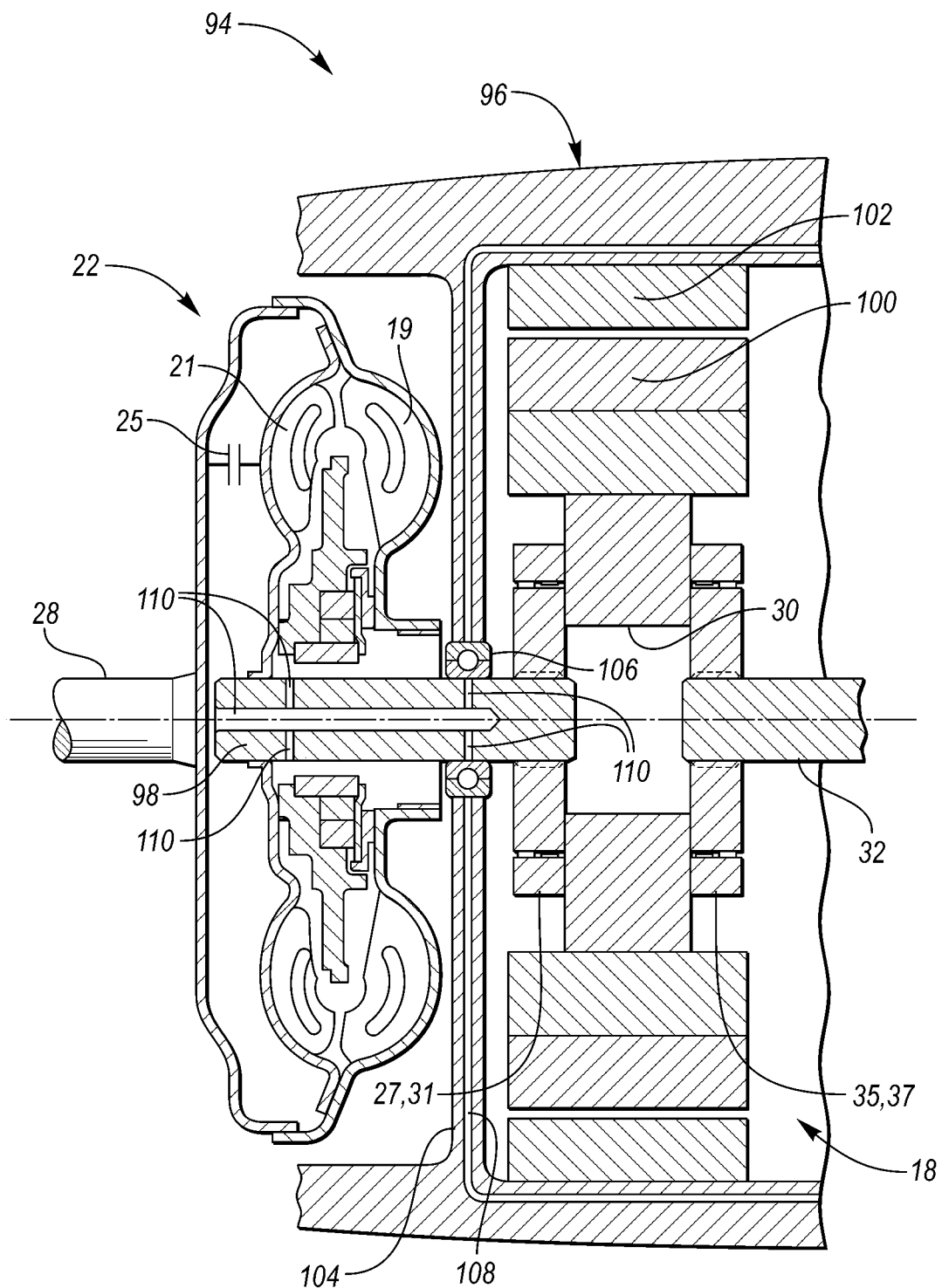
FIG. 5 is a cross-sectional view of a module that includes an electric machine and a torque converter.

Referring to FIG. 5, a cross-sectional view of a module 94 that includes the M/G 18 and the torque converter 22 is illustrated. The module 94 includes a housing 96. The module 94 is disposed between the engine 14 and the transmission gearbox 24. The housing 96 of the module may be directly secured to the engine 14 and a housing of the transmission gearbox 24. A turbine shaft 98 is rotatably secured to the turbine 21. The turbine shaft 98 may be considered a separate component relative to the turbine 21 or may be be considered an integral component of the turbine 21. The first one-way clutch 27 and second one-way clutch 31 are disposed between the turbine shaft 98 and shaft 30, which is secured to the rotor 100 of the M/G 18. A stator 102 of the M/G 18 is directly secured to an interior wall of the housing 96. The third one-way clutch 35 and fourth one-way clutch 37 are disposed between the shaft 30 and the transmission input shaft 32. The turbine shaft 98 may be rotatably secured to a partition wall 104 that is disposed between the torque converter 22 and the M/G 18. More specifically, the partition wall may define an orifice that receives a bearing 106 and the turbine shaft 98 may be rotatably secured to the partition wall 104 via the bearing 106. The housing 96 and the partition wall 104 may define fluid channels 108 that deliver hydraulic fluid from the gearbox 24 to the bearing 106 and the turbine shaft 98, in order to lubricate the bearing and to supply hydraulic fluid to the torque converter. The turbine shaft 98 may define additional fluid channels 110 that deliver hydraulic fluid to the interior of the torque converter 22 from the bearing 106 and the fluid channels 108 defined in the partition wall 104.

The controller 50 may be required to adjust the various states of the first one-way clutch 27, second one-way clutch 31, third one-way clutch 35, and fourth one-way clutch 37 based on the various states of the HEV 10, which may include an engine start, a launch (accelerating from a standstill position) of the HEV 10, charging the traction battery 20, etc.

During a start of the engine 14, the starter 64 and/or the M/G 18 may be utilized to start the engine 14. If the HEV 10 is at a standstill and the starter 64 is being utilized alone to start the engine, the torque converter lock-up clutch 25 (or launch clutch 74 in the second embodiment) will be open, and the first one-way clutch 27, second one-way clutch 31, third one-way clutch 35, and fourth one-way clutch 37 will all be deactivated and disengaged. After the engine 14 has been started, the speed of the M/G 18 may be synchronized to the turbine 21 (or to the output 78 of the launch clutch 74 in the second embodiment) prior to activating and engaging the first one-way clutch 27. If the HEV 10 is at a standstill and the M/G 18 is being utilized alone or the M/G 18 and the starter 64 are both being utilized to start the engine, the torque converter lock-up clutch 25 (or launch clutch 74 in the second embodiment) will be locked, the second one-way clutch 31 will be activated and engaged, and the first one-way clutch 27, third one-way clutch 35, and fourth one-way clutch 37 will all be deactivated and disengaged. If the HEV 10 is operating in the EV mode and an engine startup is required to transition to the HEV mode or an "engine only mode" where the engine powers the HEV 10 alone, the starter 64 will be utilized alone to start the engine, the torque converter lock-up clutch 25 (or launch clutch 74 in the second embodiment) will be open, the third one-way clutch 35 will be activated and engaged, and the first one-way clutch 27, second one-way clutch 31, and fourth one-way clutch 37 will all be deactivated and disengaged. After the engine 14 has been started, the speed of the M/G 18 may be synchronized to the turbine 21 (or to the output 78 of the launch clutch 74 in the second embodiment) prior to activating and engaging the first one-way clutch 27. The state of the transmission gear gearbox 24 during any start of the engine 14 may be a neutral condition or a condition where the transmission gear gearbox 24 is in any gear.

During a launch of the vehicle from a standstill position, the engine 14 and the M/G 18 may both be utilized to deliver power and torque to the wheels 42. If the M/G 18 powering the vehicle along in the EV mode during a launch, the torque converter lock-up clutch 25 (or launch clutch 74 in the second embodiment) will be open, the third one-way clutch 35 will be activated and engaged, and the first one-way clutch 27, second one-way clutch 31, and fourth one-way clutch 37 will all be deactivated and disengaged. If the engine 14 and the M/G 18 are powering the vehicle in the hybrid mode or if the engine is powering the vehicle alone during a launch, the torque converter lock-up clutch 25 will be open (or launch clutch 74 will be closed in the second embodiment), the first one-way clutch 27 and the third one-way clutch 35 will be activated and engaged, and the second one-way clutch 31 and fourth one-way clutch 37 will be deactivated and disengaged. It should be noted that in the first embodiment after the vehicle launch has occurred, the control system of the powertrain 12 may close the torque converter lock-up clutch 25 as soon as possible to reduce energy losses. It should also be noted that the transmission gearbox 24 must be in gear during the launch. Therefore, the power from the engine 14 and/or M/G 18 must be sufficient to power the transmission pump to ensure the internal clutches of the gearbox 24 remain engaged to prevent the gearbox 24 from transitioning to a neutral condition.

The M/G 18 may be operated by the engine 14 to recharge the battery 20 while the vehicle is being driven (e.g., the vehicle is in motion) or while the vehicle is at a standstill.

Under all recharging scenarios, the torque converter lock-up clutch 25 may be either opened (if torque multiplication and/or heating of the transmission fluid is desired) or closed (if highest energy transfer efficiency between the engine and M/G 18 is desired). If a launch clutch 74 is utilized in place of the torque converter 22, the launch clutch 74 would be closed under all recharging scenarios. The M/G 18 will be providing negative torque to recharge the battery 20 but will be controlled to a desired speed relative to the speed of the engine 14. Additionally, during all recharging scenarios, the first one-way clutch 27 will be activated and engaged while the second one-way clutch 31 and fourth one-way clutch 37 be deactivated and disengaged. The third one-way clutch 35 may be activated and engaged during a recharging operation where the vehicle is being driven and may be deactivated and disengaged during a recharging operation where the vehicle is at a standstill. The state of the transmission gearbox 24 during a recharging operation where the vehicle is at a standstill may be a neutral condition or a condition where the transmission gear gearbox 24 is in any gear. The transmission gearbox 24 will be in any driven gear during an operation where the vehicle is being driven and the battery 20 is being recharged by the M/G 18.

During a regenerative breaking operation where the vehicle is in motion and is being decelerated, power and torque will be transferred from the wheels 42 to the M/G 18 to recharge the battery 20. The M/G 18 will be providing negative torque during regenerative braking. The engine 14 may be shut down or may be on (if cabin, transmission fluid, or catalytic converter heating is required) during regenerative braking. During any regenerative braking operation, the fourth one-way clutch 37 will be activated and engaged while the first one-way clutch 27 and third one-way clutch 37 may be deactivated and disengaged. The second one-way clutch 31 may be activated and engaged if engine braking is desired. If engine braking is not desired, the second one-way clutch 31 may be deactivated and disengaged. In embodiments that include a torque converter 22, the torque converter lock-up clutch 25 may be either opened during regenerative braking (if heating of the transmission fluid is desired) or closed during regenerative braking (if heating of the transmission fluid is not desired or if engine braking is desired). In embodiments that include a launch clutch 74, the launch clutch 74 will be open during regenerative braking unless engine braking is required. Otherwise, the launch clutch 74 will be closed during regenerative braking. The transmission gearbox 24 will be in any driven gear during regenerative braking.

During a gear shift in the transmission gearbox 24, the torque converter lock-up clutch 25 (or launch clutch 74 in the second embodiment) will be open, the first one-way clutch 27 and third one-way clutch 35 may be activated and engaged, and the second one-way clutch 31 and fourth one-way clutch 37 may be deactivated and disengaged. Once the gear shift is complete, the speed of the M/G 18 will be controlled to synchronize with the engine 14 and the torque converter lock-up clutch 25 (or launch clutch 74 in the second embodiment) will be closed once synchronization has occurred.

It should be understood that the designations of first, second, third, fourth, etc. for one-way clutches, rotational directions, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an engine;
an electric machine;
a torque converter having an impeller rotatably coupled to the engine, and a turbine;
a first one-way clutch configured to, responsive to
turbine and electric machine speeds being equal, couple the turbine and the electric machine in a first rotational direction to transfer power from the turbine to the electric machine, and
the electric machine speed being greater than turbine speed, isolate the turbine from the electric machine, wherein the first one-way clutch is a selectable one-way clutch that is configured to, responsive to being activated, couple the turbine and the electric machine in the first rotational direction in response to the turbine and the electric machine speeds being equal and isolate the turbine from the electric machine in response to the electric machine speed being greater than turbine speed when activated, and responsive to being deactivated, to isolate the turbine from the electric machine at all the electric machine and the turbine speeds; and
a second selectable one-way clutch configured to, responsive to
being activated, couple the turbine and the electric machine in a second direction, that is opposite of the first direction, to transfer power from the electric machine to the turbine, and
being deactivated, isolate the turbine and the electric machine at all the electric machine and the turbine speeds.

2. The vehicle of claim 1 further comprising:
a transmission gearbox; and
a second selectable one-way clutch configured to, responsive to
being activated, couple the electric machine to an input of the transmission gearbox in the first rotational direction to transfer power from the electric machine to the transmission gearbox, and
being deactivated, isolate the electric machine from the transmission gearbox.

3. The vehicle of claim 2 further comprising:
a third selectable one-way clutch configured to, responsive to
being activated, couple the electric machine to an input of the transmission gearbox in a second rotational direction, that is opposite of the first direction, to transfer power from the input of the transmission gearbox to the electric machine and being deactivated, isolate the electric machine from the transmission gearbox.

4. The vehicle of claim 2 further comprising a damper disposed between the input of the transmission gearbox and the second selectable one-way clutch.

5. The vehicle of claim 4 further comprising a housing, wherein the torque converter and the electric machine are disposed within the housing, and wherein the housing includes a partition wall disposed between the torque converter and the electric machine.

6. The vehicle of claim 5, wherein the partition wall defines a channel configured to direct lubricating fluid to a bearing disposed about the turbine.

7. A vehicle comprising:
an engine having a crankshaft;
an electric machine having a rotor;
a torque converter having an impeller rotatably coupled to the crankshaft, and a turbine;
a first one-way clutch configured to, responsive to
turbine and rotor speeds being equal, couple the turbine and the rotor in a first direction to transfer engine power from the turbine to the rotor, and
rotor speed being greater than turbine speed, decouple the turbine and the rotor, wherein the first one-way clutch is a selectable one-way clutch configured to, responsive to being activated, couple the turbine and the rotor in the first direction in response to the turbine and rotor speeds being equal and decouple the turbine from the rotor in response to the rotor speed being greater than turbine speed, and responsive to being deactivated, decouple the turbine from the rotor at all the rotor and turbine speeds; and
a second selectable one-way clutch configured to, responsive to
being activated, couple the turbine and the rotor in a second direction, that is opposite of the first direction, to transfer power from the electric machine to the turbine, and
being deactivated, decouple the turbine and the electric machine at all the electric machine and the turbine speeds.

8. The vehicle of claim 7 further comprising:
a transmission gearbox; and
a second selectable one-way clutch configured to, responsive to
being activated, couple the rotor to an input of the transmission gearbox in the first direction to transfer power from the rotor to the transmission gearbox, and
being deactivated, decouple the rotor from the transmission gearbox.

9. The vehicle of claim 8 further comprising:
a third selectable one-way clutch configured to, responsive to
being activated, couple the rotor to an input of the transmission gearbox in a second rotational direction, that is opposite of the first direction, to transfer power from the input of the transmission gearbox to the rotor and
being deactivated, isolate the rotor from the transmission gearbox.

10. The vehicle of claim 7 further comprising a housing, wherein the torque converter and the electric machine are disposed within the housing, and wherein the housing includes a partition wall disposed between the torque converter and the electric machine.

11. A vehicle comprising:
an engine;
an electric machine;
a launch clutch having an input rotatably coupled to the engine, and an output; and
a first selectable one-way clutch configured to, responsive to
being activated, couple the output and the electric machine in the first rotational direction in response to output and electric machine speeds being equal and isolate the output from the electric machine in response to the electric machine speed being greater than output speed, and
being deactivated, isolate the output from the electric machine at all the electric machine and the output speeds; and
a second selectable one-way clutch configured to, responsive to
being activated, couple the output and electric machine in a second direction, that is opposite of the first direction, to transfer power from the electric machine to the output, and
being deactivated, isolate the output and electric machine at all electric machine and output speeds.

12. The vehicle of claim 11 further comprising:
a transmission gearbox; and
a second selectable one-way clutch configured to, responsive to
being activated, couple the electric machine to an input of the transmission gearbox in the first rotational direction to transfer power from the electric machine to the transmission gearbox, and
being deactivated, isolate the electric machine from the transmission gearbox.

13. The vehicle of claim 12 further comprising:
a third selectable one-way clutch configured to, responsive to
being activated, couple the electric machine to an input of the transmission gearbox in a second rotational direction, that is opposite of the first direction, to transfer power from the input of the transmission gearbox to the electric machine and
being deactivated, isolate the electric machine from the transmission gearbox.

14. The vehicle of claim 12 further comprising a damper disposed between the input of the transmission gearbox and the second selectable one-way clutch.

* * * * *